United States Patent
Frank et al.

(10) Patent No.: US 10,645,112 B2
(45) Date of Patent: May 5, 2020

(54) METHOD AND DEVICE FOR PROCESSING AND TRANSMITTING DATA WITHIN A FUNCTIONALLY SECURE, ELECTRICAL, ELECTRONIC AND/OR PROGRAMMABLE ELECTRONIC SYSTEM

(71) Applicant: Phoenix Contact GmbH & Co. KG, Blomberg (DE)

(72) Inventors: Tobias Frank, Lemgo (DE); Rolf Salzmann, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 114 days.

(21) Appl. No.: 15/557,648

(22) PCT Filed: Mar. 11, 2016

(86) PCT No.: PCT/EP2016/055236
§ 371 (c)(1),
(2) Date: Sep. 12, 2017

(87) PCT Pub. No.: WO2016/146504
PCT Pub. Date: Sep. 22, 2016

(65) Prior Publication Data
US 2018/0069890 A1    Mar. 8, 2018

(30) Foreign Application Priority Data
Mar. 13, 2015 (DE) .......................... 10 2015 103 740

(51) Int. Cl.
*H04L 29/06* (2006.01)
*G06F 21/54* (2013.01)

(52) U.S. Cl.
CPC .......... *H04L 63/1433* (2013.01); *G06F 21/54* (2013.01); *H04L 63/105* (2013.01)

(58) Field of Classification Search
CPC .... H04L 63/1433; H04L 63/105; G06F 21/54
See application file for complete search history.

(56) References Cited

U.S. PATENT DOCUMENTS

| 5,596,718 A | 1/1997 | Boebert et al. |
| 8,024,788 B2 * | 9/2011 | Arnold ................ G06F 21/6218 713/151 |

(Continued)

FOREIGN PATENT DOCUMENTS

| EP | 0845733 A2 | 6/1998 |
| EP | 1654850 A1 | 5/2006 |

(Continued)

OTHER PUBLICATIONS

English translation of the International Search Report dated May 6, 2016, issued in connection with International Application No. PCT/EP2016/055236 (2 pages total).

(Continued)

*Primary Examiner* — Mohammed Waliullah
(74) *Attorney, Agent, or Firm* — John Maldjian; Maldjian Law Group LLC (57) ABSTRACT

Processing and transmitting of data within a functionally safe electronic system having at least two subsystems, each of which comprises at least one safety component, and each of which complies with a specific safety level for functionally safe data processing. Embodiments process data using the safety component of a first one of the subsystems into functionally safe data of a first safety level, and add an indication attribute indicating suitability of these data for use of this first safety level; transmitting the data to a second one of the subsystems; and checking the received indication attribute, by the second subsystem using the safety component, to determine whether the safety level indicated by this indication attribute is different from the safety level the second subsystem complies with; and, if the check reveals (Continued)

non-equal safety levels, further processing the data in functionally a safe manner based on the lower safety level.

9 Claims, 3 Drawing Sheets

(56) References Cited

U.S. PATENT DOCUMENTS

| | | | |
|---|---|---|---|
| 8,140,863 B2* | 3/2012 | Brown | G06F 21/305 |
| | | | 713/193 |
| 2003/0112996 A1* | 6/2003 | Holliman | G06T 1/0028 |
| | | | 382/100 |
| 2007/0182983 A1* | 8/2007 | Wyatt | G06F 21/50 |
| | | | 358/1.15 |
| 2014/0283107 A1 | 9/2014 | Walton et al. | |

FOREIGN PATENT DOCUMENTS

| | | |
|---|---|---|
| EP | 1921560 A1 | 5/2008 |
| WO | 2005015868 A1 | 2/2005 |
| WO | 2005085971 A1 | 9/2005 |

OTHER PUBLICATIONS

Phoenix Contact GmbH & Co.KG, Translation of International Preliminary Report on Patentability dated Sep. 28, 2017, which issued in connection with corresponding International Application No. PCT/EP2016/055236, 8 pages.

* cited by examiner

METHOD AND DEVICE FOR PROCESSING AND TRANSMITTING DATA WITHIN A FUNCTIONALLY SECURE, ELECTRICAL, ELECTRONIC AND/OR PROGRAMMABLE ELECTRONIC SYSTEM

CROSS-REFERENCE TO RELATED APPLICATIONS

This application claims the benefit under 35 U.S.C. § 371 of International Application No. PCT/EP2016/055236 filed on Mar. 11, 2016, which in turn claims the benefit of German application 102015 103 740.8 filed on Mar. 13, 2015, the entire content of each of which is hereby incorporated by reference in its entirety.

FIELD

Embodiments of the invention relate to methods and devices for processing and transmitting data within a functionally safe electrical, electronic and/or programmable electronic system which is composed of at least two subsystems.

BACKGROUND

Functionally safe electrical, electronic and programmable electronic systems are known to be described in international standard IEC 61508 and in the essentially equivalent European standard EN 61508, also regarding their development, inter alia. The requirements for the development process of safe systems as specified therein lead to a significantly higher effort and required development budget as compared to the development of standard systems. Also, the requirements increase with increasing safety integrity level ("SIL"; SIL1 to SIL4).

The use of components which do not comply with the requirements of IEC 61508 for safe systems is also regulated normatively.

For example, Part 3 "Requirements on software" of IEC 61508, as amended by 2010 (IEC 61508-3:2010), specifies under paragraph 7.4.2.8:
"If the software implements both safety and non-safety functions, the entire software shall be treated as safety-related unless appropriate measures ensure that a failure of non-safety functions cannot adversely affect safety functions;
and under paragraph 7.4.2.9:
"If the software implements safety functions of different safety integrity levels, the entire software shall be treated as pertaining to the highest safety integrity level, unless sufficient independence between the safety functions of the different safety integrity levels can be demonstrated in the design. It has to be demonstrated that either (1) independence is achieved both in the space and time domains, or (2) any violation of independence can be mastered. Justification for this independence shall be documented."

Thus, the term "safety integrity level" (SIL) defines, by the respective level, a specific measure for the necessary or achieved effectiveness of safety instrumented functions for risk reduction. If no safety-oriented requirements (also referred to as safety-related or safety-relevant within the context of the invention) apply, the development has to be carried out according to the normal standards of operational quality management. Further, the safety integrity level SIL1 has the lowest requirements. The higher the safety integrity level, the higher the safety requirements.

SUMMARY

An object of the present invention is to provide a method and a device which can be used to compose and operate a system based on safety components and optionally also based on standard components in such a manner that the normative requirements for a safe system are met and the system to be developed is therefore capable of reliably detecting a violation of independence so as to master it, in particular also a violation of the independence between standard and safety subsystems.

This object is achieved according to embodiments of the invention by a method and a device as claimed in the pending independent claims. Advantageous and favorable further embodiments are specified by the subject matter of the respective dependent claims.

Embodiments of the invention accordingly provides a method for processing and transmitting data within a functionally safe electrical, electronic and/or programmable electronic system (generically, "a functionally safe electronic system"), which is composed of at least two subsystems, each of which comprises at least one safety hardware and/or software component (collectively or individually, "safety component"), and each of which complies with a specific safety level for functionally safe data processing. The method further contemplates processing of the data using the safety hardware and/or software component of a first one of the subsystems into functionally safe data of a first safety level, and adding to these data, by this first subsystem, at least one indication attribute indicating suitability of these data for use of this first safety level. These data including the added indication attribute are then transmitted from this first subsystem to a second one of these subsystems and hence are received by this second subsystem.

The received indication attribute is then checked by the second subsystem using the safety hardware and/or software component thereof to determine whether the safety level indicated by this indication attribute is equal to or different from the safety level the second subsystem is complying with. If the check reveals non-equal safety levels, the data are subsequently further processed in functionally safe manner based on the lower safety level.

A substantial advantage hereof is that each subsystem and consequently substantially each component or device may meet an own and even a respective different safety level, and yet a system can be composed form these subsystems, which in turn complies, in its entirety, with a particular safety level. Since in the present case the system composed of different subsystems detects different safety levels and the further processing of data is always performed based on the lower one of two different safety levels, embodiments of the invention are capable of satisfying the requirement for a functionally safe system, although the latter is modularly composed from subsystems of different safety levels.

For carrying out the method, embodiments of the invention furthermore provide a device which comprises a safety hardware and/or software component that complies with a specific safety level for functionally safe data processing.

The safety hardware and/or software component is configured in this case to process data into functionally safe data of a specific safety level and then to add at least one indication attribute to these data, which indicates suitability of these data for use of this specific safety level. In addition or as an alternative, the safety hardware and/or software component is configured, when receiving data that have been processed into functionally safe data of a specific safety level and to which an indication attribute has been added indicating suitability of these data for use of this specific safety level, to check the indication attribute added to these data to determine whether the safety level indicated by this indication attribute is equal to or different from the safety level the hardware and/or software component is complying with, and if the check reveals non-equal safety levels, to perform further processing of the data based on the lower safety level.

BRIEF DESCRIPTION OF THE DRAWINGS

The aforementioned and further features of the invention will now be explained in more detail in and/or will be apparent from the following description of exemplary embodiments with reference to the accompanying drawings, and it will be appreciated that these features can not only be used in the respective described combination but also in other combinations or alone without departing from the scope of the invention. In the referred drawings.

DETAILED DESCRIPTION

In the context of embodiments of the invention and in the specification and the claims, the term "safety" relates to functional safety, unless otherwise stated.

According to the standard IEC 61508 series, functional safety furthermore includes the use of various methods for mastering faults, such as the avoidance of systematic faults during the development, monitoring during operation to detect random faults, and/or the reliable mastering of detected faults and transition to a condition that has previously been defined as safe. All these measures can be part of specific predefined safety functions. More generally, it can be stated that two- or multi-channel systems in which each channel alone can trigger a safety function are capable of achieving a higher SIL with less technical complexity than those which have only one channel. Here, the term channel refers to the information flow through a safety loop, for example starting with a request of a safety function (e.g. by a sensor, proximity detector, light barrier, or pushbutton), and terminating at the actuator which initiates the safe state of a machine.

Accordingly, electrical safety/Security does not belong to this functional safety.

Therefore, if it is guaranteed by suitable measures that an electrical, electronic and/or programmable electronic system, but also an individual hardware and/or software component effectively fulfills a specific safety function, this system or the respective component is considered to be a safety component or system within the context of the following description and the claims. If there are no safety-related requirements applying to a system and also for an individual hardware and/or software component, so that compliance with a specific safety function by suitable measures is not guaranteed for the system or the individual hardware and/or software component, this system or the respective component is considered to be a non-safety or standard system or component within the context of the following description and the claims.

A method and a device for computer-assisted design of a safety-oriented electrical circuit is known from DE 10 2004 020 994 B4.

Accordingly, a plurality of circuit components are provided, selected and linked, and furthermore a plurality of sets of rules are provided, and each set of rules in turn includes a plurality of safety-related design rules, and at least one of the sets of rules includes a design rule which requires multichannel redundant output signals of the circuit components and/or a feedback circuit for each output signal. The electrical circuit is furthermore subdivided into subsections, and for each of the subsections a set of rules is defined prior to the selection and linking of the circuit components, and the defined set of rules is selected and a check is made as to whether the selected and linked circuit components completely comply with the design rules of this defined set of rules, so that each subsequent selection and/or linking of circuit components is enabled or inhibited as a function of the selected defined set of rules, and the defined set of rules is displayed.

This is intended to facilitate and accelerate engineering of safety-oriented circuits without compromising the fail-safety of the circuit being engineered, wherein engineering herein refers to the engineering of a particular circuit as a whole system. Because first individual sets of rules are defined and selected for this circuit, each one containing a multitude of safety-related design rules, and then the circuit components complying with the design rules of the respective sets of rules are selected and linked.

Figure 1:
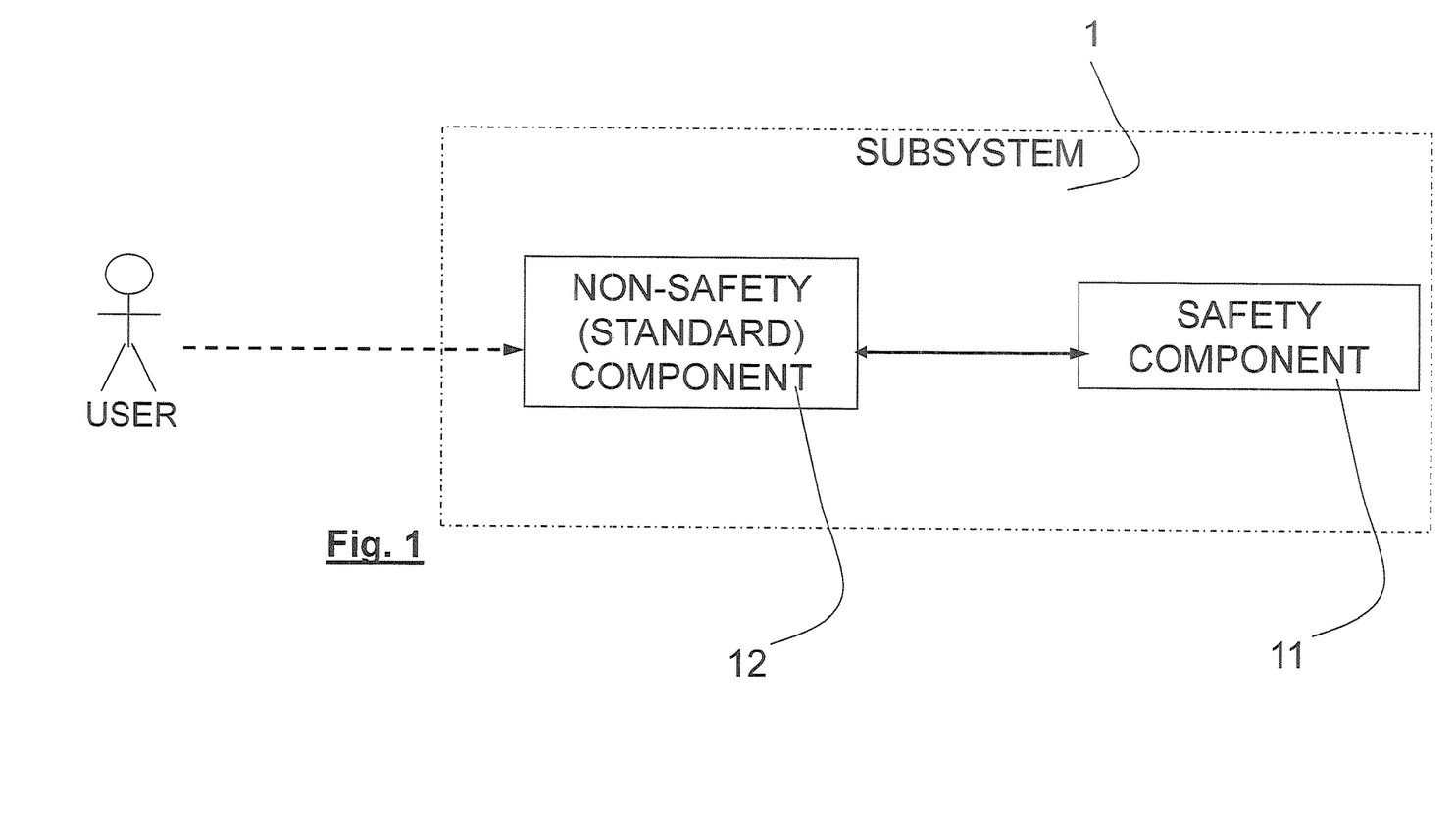
FIG. 1 shows a greatly simplified principle diagram of an exemplary embodiment of a subsystem comprising at least one safety hardware and/or software component.

FIG. 1 shows a greatly simplified principle diagram of an exemplary embodiment of a subsystem 1 comprising at least one safety hardware and/or software component 11, wherein the safety hardware and/or software component 11 complies with a specific safety level for functionally safe data processing. Such a safety component will also be referred to as "safety context" in the description below and also in the drawings.

The safety hardware and/or software component 11 is part of a device not shown in more detail in the drawings, in particular of an electrical, electronic and/or programmable electronic device of an electrical, electronic and/or programmable electronic system which is composed of at least two subsystems each of which comprises at least one safety hardware and/or software component and each of which complies with a specific safety level for functionally safe data processing. An electrical, electronic and/or programmable electronic system composed of at least two subsystems can be seen in the greatly simplified principle diagram of an exemplary embodiment of a system according to FIG. 2, which is composed of two subsystems 2 and 3 each of which comprises at least one safety hardware and/or software component 21a to 21c, and 31a, 31b, respectively.

According to one embodiment, the safety hardware and/or software component such as safety hardware and/or software component 11 is configured to process data into functionally safe data of a specific safety level and then to add to these data an indication attribute indicating suitability of these data for use of this specific safety level. Such a safety component is therefore producing functionally safe data. A device or a subsystem that comprises one or more of such safety components that produce functionally safe data will be referred to as a "safety server" below.

According to a further embodiment, the safety hardware and/or software component such as safety hardware and/or software component 11 may, however, as well be configured, upon receipt of data that have been processed into functionally safe data of a specific safety level and to which an indication attribute has been added indicating suitability of these data for use of this specific safety level, to check the indication attribute added to these data to determine whether the safety level indicated by this indication attribute is equal to or different from the safety level the hardware and/or software component is complying with, and if the check reveals non-equal safety levels, to perform further processing of the data based on the lower safety level. Such a safety component therefore initially consumes functionally safe data while evaluating them. A device or a subsystem that comprises one or more of such safety components which consume functionally safe data will be referred to as a "safety client" below.

Figure 3:
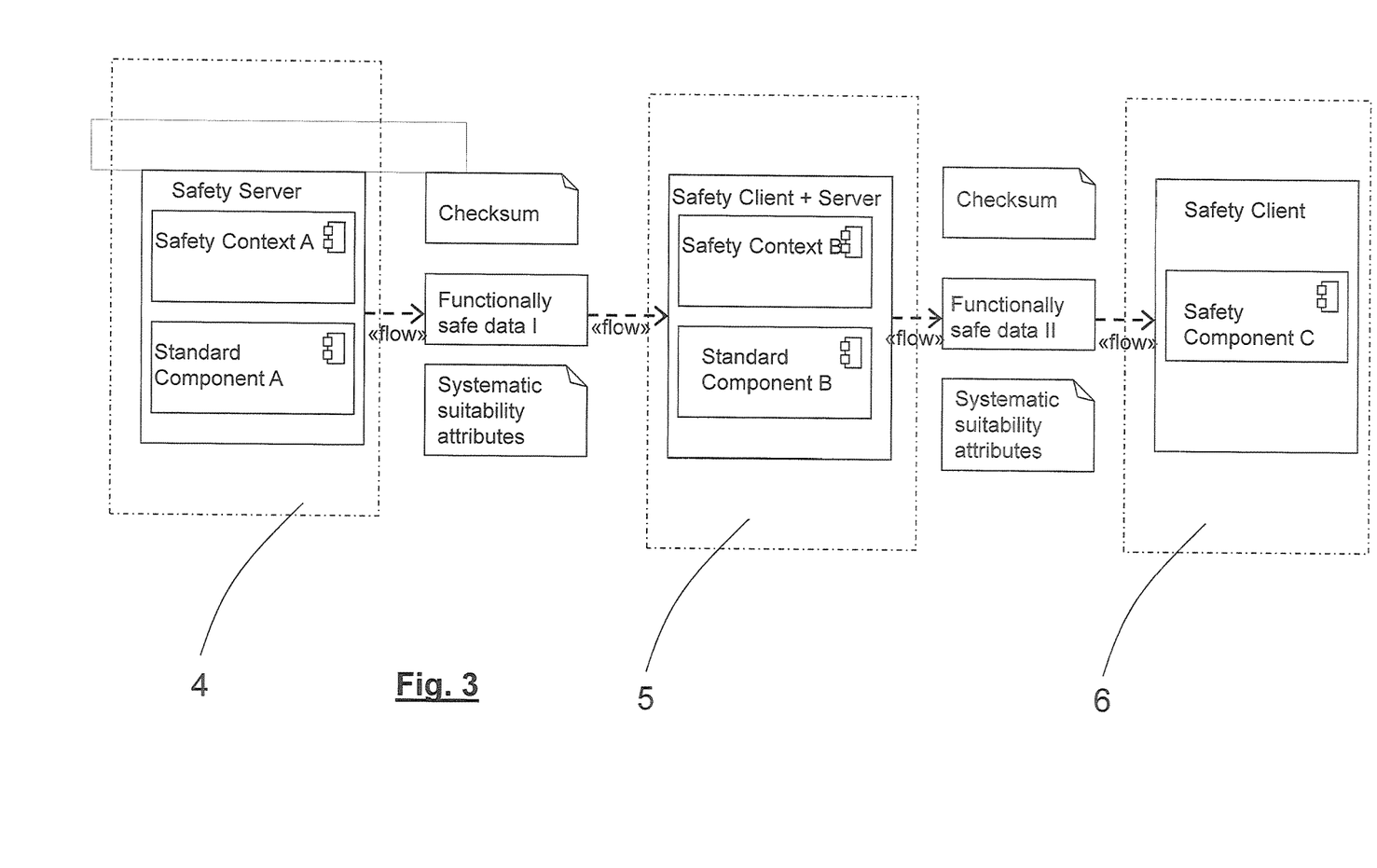
FIG. 3 shows a greatly simplified principle diagram of the processing and transmitting of data within a system that is or is being composed of three subsystems, by way of example, each of which comprises at least one safety hardware and/or software component.

Also within the scope of embodiments of the invention, a safety component such as for instance the safety component labeled "Safety Context B" within a subsystem 5 of FIG. 3, may initially consume and thereby evaluate functionally safe data and then in turn produce functionally safe data. Thus, a device or a subsystem comprising one or more of the safety components for both, evaluating functionally safe data and also altering or producing functionally safe data, such as the subsystem 5 of FIG. 3, can accordingly assume both the role as a safety server and as a safety client.

Therefore, within the context of embodiments of the invention, the subsystem 1 of FIG. 1 is favorably also part of a higher level system not shown in further detail in FIG. 1. In addition to the at least one safety hardware and/or software component 11, the subsystem may further be composed of at least one non-safety hardware and/or software component 12 (collectively or individually, "non-safety component"). Subsystem 1 may, for example, be a programming system which is used by a "user", in particular a programmer, to create a safe control program using suitable software components. In such a case, i.e. if a subsystem such as subsystem 1 further comprises at least one non-safety hardware and/or software component 12 in addition to the at least one safety hardware and/or software component 11, the processing of data by the non-safety hardware and/or software component 12 is monitored by the safety hardware and/or software component 11 of the subsystem so that the data are not corrupted during the processing, as will be described in more detail below. Consequently, with the monitoring of the standard components by the safety components, a functionally safe subsystem is again obtained.

Within the scope of embodiments of the invention, data are first processed into functionally safe data of a first safety level within a system composed of at least two functionally safe subsystems using a safety hardware and/or software component of a first subsystem. Then, the first subsystem adds at least one indication attribute to these data, which indicates suitability of these data for use of this first safety level.

If subsequently these data including the added indication attribute are transmitted by this first subsystem to a second one of these subsystems, where they are received including the added indication attribute, the second subsystem will check the received indication attribute using its safety hardware and/or software component in order to determine whether the safety level indicated by this indication attribute is equal to or different from the safety level the second subsystem is complying with. If the check reveals non-equal safety levels, further processing of the data is performed in functionally safe manner by the second subsystem based on the lower safety level.

Figure 2:
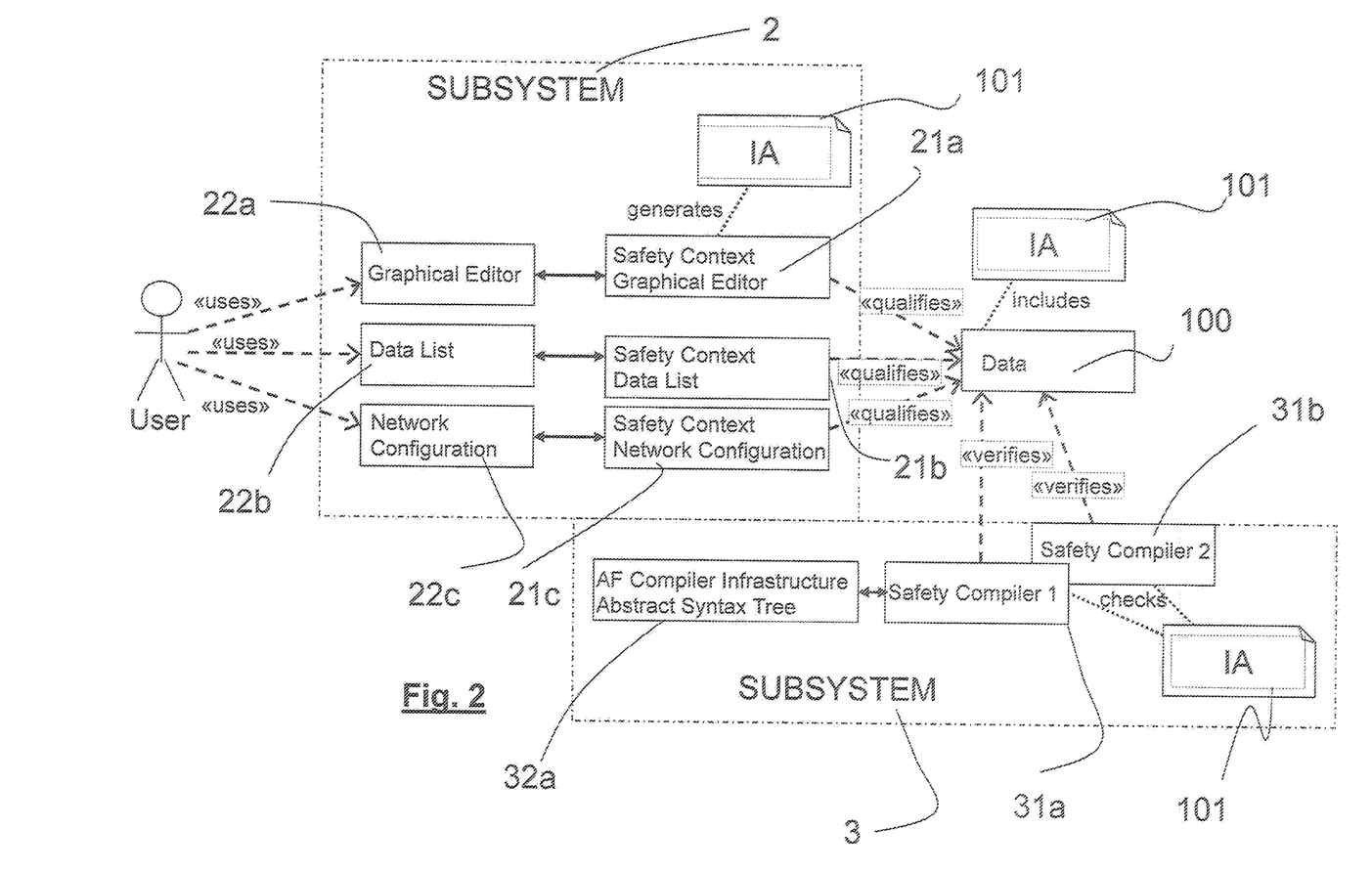
FIG. 2 shows a greatly simplified principle diagram of an exemplary embodiment of a system composed of subsystems, the system according to the exemplary embodiment being composed of two subsystems each one comprising at least one safety hardware and/or software component.

As already mentioned above, such a functionally safe electrical, electronic and/or programmable electronic system that is or is being composed of at least two subsystems each of which comprises at least one safety hardware and/or software component and each of which complies with a specific safety level for functionally safe data processing, is illustrated in FIG. 2, by way of example. A first subsystem 2 for instance provides a user interface in this case, which is accessible by a user to generate a control program that is intended to be subsequently transmitted to a second subsystem 3. The safety hardware and/or software components 21a, 21b, 21c of the first subsystem 2 may therefore include a safety program editor component 21a, a safety data list component 21b, and/or a safety network configuration component 21c, for example. The subsystem may only comprise such safety components, or else, as is the case in the embodiment of FIG. 2, may additionally be composed of non-safety hardware and/or software components 22a, 22b, and/or 22c, such as a non-safety program editor component 22a, a non-safety data list component 22b, and/or a non-safety network configuration component 22c, for example.

A second subsystem 3 may for instance provide a compiler environment in this case, to which the control program generated by subsystem 2 is transmitted. The safety hardware and/or software components 31a and 31b of the second subsystem 3 may thus include safety components of different compilers, for example. Subsystem 3 may additionally comprise a non-safety hardware and/or software component 32a, for example, which includes a non-safety compiler infrastructure with an abstract syntax tree, for example.

Thus, the system of FIG. 2 also distinguishes between producers of functionally safe data and consumers of functionally safe data.

In the present example, the subsystem 2 accordingly represents a producer or "safety server" and the subsystem 3 represents a consumer or "safety client", and in the example of FIG. 2 both the safety server (subsystem 2) and the safety client (subsystem 3) are combined of standard components and safety components. As stated above, in such a case the safety server monitors the data that are generated using standard components. Favorably, in such a case, the safety client furthermore monitors the data which are evaluated using standard components. Such monitoring by the safety server and the safety client is indicated by the respective double-ended arrows between the standard components and the safety components in FIG. 2.

This ensures that the data are not corrupted by the standard components. This monitoring is favorably performed during and outside of data changes. Preferably, for this purpose, prior to the processing of data by a non-safety hardware and/or software component, data which are not to be changed are separated from the remaining data and are separately saved and/or separately have a checksum assigned thereto. Thus, the data are appropriately segmented so as to be subdivided into data which are to be changed and data which are not to be changed. The data that are going to be changed, whether by deleting, adding, or modifying data, are released for the change. The data which must not be changed are preferably saved in a RAM and/or on a separate hard disk by appropriate methods such as checksums including hash values during the change of the data to be changed.

Appropriately, in this case, attention should be paid to have a largest possible fraction of protected data, i.e. the data which are not changed.

Correct functionality of the data monitoring can be ensured by suitable methods that may per se be known, such as logical program sequence monitoring. If a checksum and further attributes that ensure data consistency and data integrity are calculated, it will only be a safety component or the safety context of a safety server to do so. In this way, both data changes outside the safety component or the safety context and a malfunction of the safety server will be detected reliably.

Besides the checksum for proof of data consistency and integrity, the safety context of the safety server, such as indicated for safety context 21a of FIG. 2, in any case generates an aforementioned indication attribute 101 for the data it is going to transmit, and then qualifies these data with this indication attribute 101, so that the data 100 ultimately transmitted from the safety server (e.g. subsystem 2 of FIG. 2) to the safety client (e.g. subsystem 3 of FIG. 2) will additionally contain the indication attribute 101.

Such an indication attribute 101 which indicates suitability of data for use of a specific safety level, thus also identifies in particular a systematic suitability of the safety server. Examples of such indication attributes include a maximum achievable SIL (safety integrity level), a maximum achievable PL (performance level), and/or the use of a predefined language range, such as according to LVL (Limited Variability Languages) or FVL (Full Variability Language) which is thereby defined in view of subsequent processing.

All of the aforementioned checksums and (extended) attributes which are used for data qualification are then evaluated in the further course by a safety client (e.g. subsystem 3 of FIG. 2) receiving the data. As mentioned above, safety clients are often composed subsystems as well, consisting not only of safety components but also of standard components, but are reliably evaluating data that are qualified as functionally safe, especially using the safety components, in a safety-oriented manner. For this purpose, the safety client appropriately verifies a checksum that is possibly received together with the received data, for verifying data consistency and data integrity, as well as the indication attributes which indicate the systematic suitability of the functionally safe data. If the safety client identifies a violation of data consistency or data integrity or that the systematic suitability of the data is incompatible with the systematic suitability of the safety client, then the data are not processed in a functionally safe manner by the safety client according to a preferred embodiment. Processing under this circumstance can thus only be performed under loss of a safety integrity level. In other words, the received data are evaluated with regard to data integrity by this second subsystem using the safety hardware and/or software component thereof, and according to a preferred embodiment are further processed in a functionally safe manner only if based on the evaluation data integrity has been identified. However, according to a preferred embodiment, in the case of a combination of subsystems with different systematic suitability, the indication attributes are always adapted to the lower safety level, i.e. set to the value of the lower safety integrity level, for example. Thus, once the data have been transferred between two subsystems, the receiving subsystem will preferably always set the indication attribute added to the data to an indication attribute indicating the least safety level out of the group of the safety levels the subsystems involved in the transmission are complying with and for which during this transmission the transmitted data are marked as being suitable.

If the functionally safe data are neither changed nor further processed in a safety-oriented manner, then any number of standard components can in principle be involved in the forwarding of the data or storage thereof, in the sense of a black channel.

The above-described system configuration and the method implemented therewith can be very effectively applied in the entire process chain from the programming system to the safety control system.

Referring to FIG. 3, a further preferred exemplary embodiment will be described below.

It is assumed, here, that a machine manufacturer uses a protective device for risk reduction of a machine, which comprises an emergency stop and an active optoelectronic protective device (AOPD). This will usually be an emergency stop switch that is used to quickly place the machine into a safe state in the event of danger or to avoid a hazard, and, as an AOPD a light curtain, an inductive proximity switch, or a capacitive distance sensor, for example.

A drive cannot be activated unless both protective devices report a safe state. This protective device is monitored by a safety controller that is programmed using a programming system. For this purpose, a programmer creates a safety control program using a suitable software. This software consists of both standard and safety components. With the monitoring of the standard components by the safety components, a functionally safe system is resulting. The programmer can thus use the system for use in safety engineering. By way of example and simplified, the system is composed as follows.

The safety control program is developed using a program editor. This program editor is illustrated by the subsystem 4 in FIG. 3. The program editor consists of standard software components, in FIG. 3 represented by "Standard Component A" of subsystem 4, which enable input and display of the control program. Furthermore, in the context of safety technology, the program editor consists of safety software components, in FIG. 3 represented by "Safety Context A" of subsystem 4. The safety software components monitor the correct functioning of the program editor and ensure the integrity of the data of the control program. The safety software components qualify the data of the safety application program, which in the present example is the control program, by the safety-related indication attributes described above, and preferably by the checksums and (extended) attributes. Thus, the program editor, i.e. the subsystem of FIG. 3 represents a safety server.

The data of the control program are forwarded to at least one compiler in order to generate, from the program sources, executable machine code for the safety control. This at least one compiler is illustrated by the subsystem 5 in FIG. 3. The transfer can also be performed via an intermediate storage on a hard disk or other non-volatile memory media. The at least one compiler verifies data integrity and the systematic suitability of the data, which are defined by the safety-related attributes, i.e. by the safety-related indication attributes described above and preferably the checksums and (extended) attributes. If integrity has been violated or if the data do not comply with the required systematic suitability, the further processing is not continued in a functionally safe manner. In this method step, the at least one compiler therefore acts as a safety client (see subsystem 5 of FIG. 3).

When the at least one compiler processes the program sources into executable machine code, a checksum for data integrity is favorably calculated on the machine code. Furthermore, the machine code is provided with the safety-related indication attributes. The latter can be identical to those of the program sources, or can be supplemented or reduced. That means, when embodiments of the invention are implemented in practice, the indication attributes may not have a higher safety level after processing of the data than the indication attributes of the source data. In this method step, the at least one compiler therefore serves as a safety server (see subsystem 5 of FIG. 3).

The machine code and the associated safety-relevant data are transferred to the safety controller via a communication relation between the safety programming software and the safety control. In the context of embodiments of the present invention, it is likewise possible to use a black channel as mentioned before for this type of communication, which then assumes neither the role as a safety client nor as a safety server since the data are not changed by the transfer.

The safety controller is illustrated by the subsystem 6 in FIG. 3.

The safety controller receives the machine code and verifies both data integrity and the systematic suitability of the machine code. If the check is successful, the safety controller will execute the machine code. In embodiments of the present invention, the safety controller is therefore again a safety client.

Since in this manner a system composed of different subsystems according to embodiments of the invention identifies different safety levels and always performs further processing of data at the lower one of two different safety levels, the requirement for a functionally safe system can always be met. However, if the processing of data by the safety hardware and/or software component of a subsystem is performed based on a safety level which is lower than the safety level this subsystem complies with, this is preferably notified by this subsystem to the subsystem downstream in the data processing chain of a system and/or to a user.

LIST OF REFERENCE NUMERALS

1 Subsystem
11 Safety hardware and/or software component
12 Non-safety (standard) component
2 Subsystem
21a, 21b, 21c Safety hardware and/or software components
22a, 22b, 22c Non-safety (standard) components
3 Subsystem
31a, 31b Safety hardware and/or software components
32a, 22b, 22c Non-safety (standard) components
4 Subsystem
5 Subsystem
6 Subsystem
100 Data
101 Indication attribute

The invention claimed is:

1. A method for functionally safe processing and transmitting data the method comprising the steps of:
using a functionally safe electronic system for the functionally safe processing and transmitting, the functionally safe electronic system comprising at least two subsystems, each subsystem comprising at least one safety component configured for implementing one or more safety functions complying with a specific safety integrity level (SIL) for functionally safe data processing, wherein the functionally safe electronic system, safety components, safety functions, and SIL thereof are each at least compliant with an International Electrotechnical Commission (IEC) 61508 standard for functional safety;
processing data in a functionally safe manner compliant with IEC 61508, using the at least one safety component of a first of the at least two subsystems, into functionally safe data of a first SIL;
adding to said data, by said first subsystem, at least one indication attribute indicating suitability of said data for use at the first SIL, in which the indication attribute is configured to selectively identify a specific SIL from a range of different SILs;
transmitting said data including the added indication attribute from said first subsystem to a second of said at least two subsystems;
receiving said data including the added indication attribute by said second subsystem;
determining, by the at least one safety component of said second subsystem, whether the first SIL indicated by said indication attribute is equal to a second SIL with which the second subsystem is complying; and
responsively to the first and second SILs being not equal, further processing the data in a functionally safe manner compliant with IEC 61508 based on a lower of the first and second SILs.

2. The method of claim 1, further comprising steps of:
evaluating integrity of the received data by the at least one safety component of the second subsystem; and
performing the step of further processing only if the integrity of the data is detected on the basis of said evaluation.

3. The method of claim 1, further comprising a step of, when the first safety level is lower than a safety level of the subsystem downstream in a data processing chain, notifying the subsystem downstream in a data processing chain, that the first safety level is lower than the safety level the downstream subsystem is complying with.

4. The method of claim 1, wherein each of the at least two subsystems comprises at least one non-safety component.

5. The method of claim 4, further comprising a step of monitoring the processing by the safety component of the same of the at least two subsystems so as to ensure that the data is not corrupted.

6. The method of claim 5, further comprising steps of separating, prior to the step of processing of data by the at least one non-safety component, portions of the data which are not intended to be changed from the remaining data; and
saving the separated portions of the data separately from non-separated data or having a checksum assigned to the separated portions.

7. The method of claim 1, wherein the indication attribute defines one of a maximum achievable safety integrity level and use of a predefined language range.

8. The method of claim 1, further comprising a step of setting, following the step of transmitting, the indication attribute for indicating a lowest safety level of a plurality of safety levels the at least two subsystems are complying with and for which the transmitted data is indicated as being suitable.

9. A device for functionally safe processing and transmitting data, the device comprising:
a safety component disposed in a functionally safe electronic system, the safety component configured to implement one or more safety functions complying with a specific safety integrity level (SIL) for functionally safe data processing, wherein the functionally safe electronic system, safety component, safety functions, and SIL thereof are each at least compliant with an International Electrotechnical Commission (IEC) 61508 standard for functional safety;

process data in a functionally safe manner compliant with IEC 61508 into functionally safe data of the specific SIL;

add to said data at least one indication attribute which indicates suitability of said data for use at the specific SIL, in which the indication attribute is configured to selectively identify a specific SIL from a range of different SILs;

determine, upon receipt of data processed into functionally safe data of a specific SIL and to which an indication attribute has been added indicating suitability of said data for use at the specific SIL, from the indication attribute added to said data whether the specific SIL is equal to a second SIL with which the safety component is complying; and responsive to the specific SIL and the second SIL not being equal, further process the data in a functionally safe manner compliant with IEC 61508 based on a lower of the specific SIL and the second SIL.

\* \* \* \* \*